May 15, 1923.

Re. 15,605

A. M. BATES

BAG FORM

Original Filed March 27, 1919

INVENTOR
Adelmer M. Bates.
By Owen, Otis & Crampton
His Attorneys.

Reissued May 15, 1923. Re. 15,605

UNITED STATES PATENT OFFICE.

ADELMER M. BATES, OF CHICAGO, ILLINOIS, ASSIGNOR TO BATES VALVE BAG COMPANY, OF CHICAGO, ILLINOIS, A CORPORATION OF WEST VIRGINIA.

BAG FORM.

Original No. 1,333,374, dated March 9, 1920, Serial No. 285,697, filed March 27, 1919. Application for reissue filed March 1, 1923. Serial No. 622,216.

*To all whom it may concern:*

Be it known that I, ADELMER M. BATES, a citizen of the United States, residing at Chicago, in the county of Cook and State of Illinois, have made an invention appertaining to Improvement in Bag Forms, of which the following is a specification.

My invention relates to bag material adapted for use in preparing filled bags which are to be formed from continuous rolls of bag material.

The operation of forming and filling such bags is, of course, commonly carried on by machinery and it is undesirable if not impracticable to print the exterior of the bags after they have been filled.

I have found in working out my method of making filled bags from continuous rolls of material, that it is highly inconvenient owing to various conditions and business methods which prevail in this art, to print the bag material as part of the immediate process of making and filling the bags. I find that it is better to do the bag printing as a separate process and to feed from continuous rolls of such separately printed bag material into the apparatus for making and filling such bags.

It is, however, indispensable that the printed material on each bag should be properly located on the finished bag, otherwise the finished product will be unsymmetrical. It is extremely difficult, owing to the use of machines and the necessity of relying on those who operate the machines, to get this necessary symmetry.

For all these reasons, I have worked out the solution of the problem.

The invention is illustrated in the accompanying drawing wherein—

Figure 1:
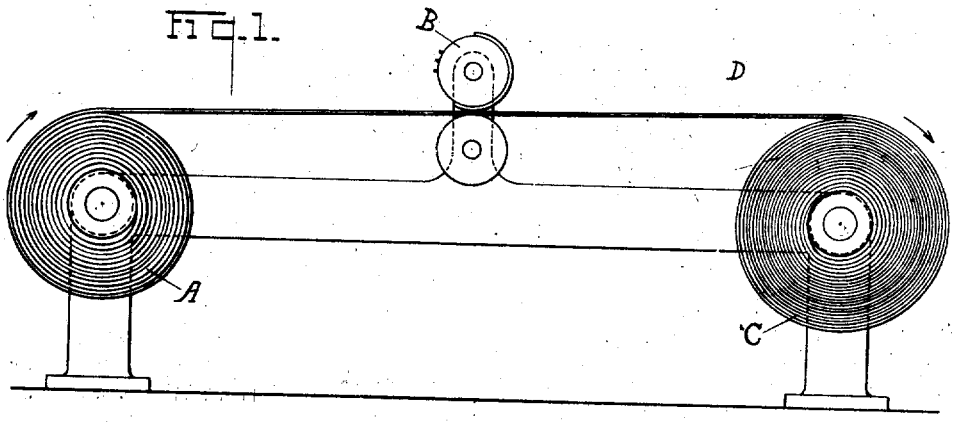
Figure 2:
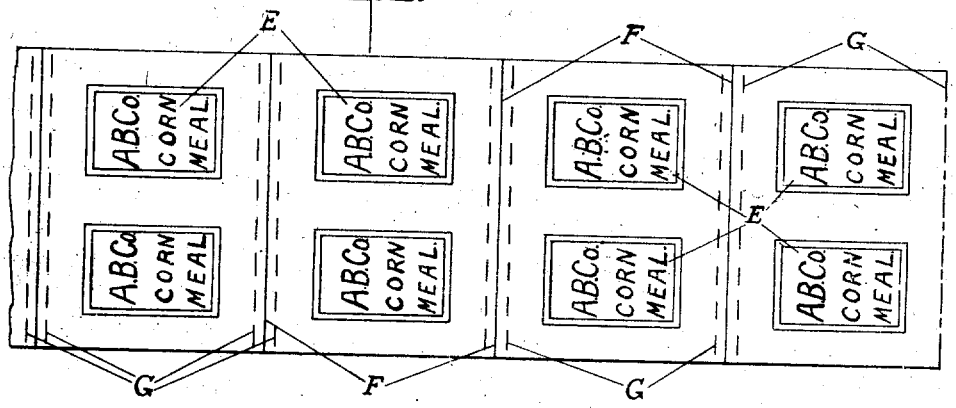
Figure 3:
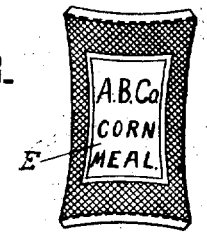

Figure 1 is a diagrammatic representation of a method of forming the printed roll; Fig. 2 is a plan view of a section of such printed roll; Fig. 3 is a view of a filled bag formed from such roll.

Like parts are indicated by like letters throughout the several figures.

A is a roll of raw or unprinted material; B a printing apparatus, diagrammatically shown, through which it passes, and C a roll of the finished or printed material. D is the material in question, which is shown with the successively printed and similar sections E, E at the side and the intermediate indication marks F, which indicate the line of severance. G, G are the stitching line indicator marks placed on opposite sides of the lines F, F in equal distance therefrom. These lines may be made in any desired manner, the object of them being to clearly show the operator where the stitching and the severing are to be done. One or more of them may be used. The rolls of such printed marked material may be prepared anywhere and apart from or in a factory or building other than that in which the bag filling and making operation is carried out. The rolls so formed, printed and marked, are fed into the bag filling and making machine in any desired manner, and the product emerges as the finished bag with the printed material in every instance in the exact desired position on the bag. The operator has always before him as the work progresses the mark or marks indicating where the goods is to be stitched or severed or both, so that the roll will always be placed, by him, in the proper position to insure the desired symmetry.

The printed material, in actual practice, is first folded and stitched so as to form a tube with the seam outside and the printed matter inside. This tube is then reversed so as to bring the seam inside and the printed matter outside. The bags are then formed by successively depositing in the tube a series of measured quantities, each of which occupies a section of the tube, and the tube is so manipulated that the printed material comes into proper position on the outside of such tube. Two seams are then run across the tube, between successive charges, and the bag material is severed between the seams, and by continuing this process a series of bags will be produced from this material. This stitching and severing operation is made certain by the presence of the indicating lines or marks, so as always to bring the printed material into symmetrical relation with the ends of the bag.

I have spoken of the roll of material but, of course, it will be understood that by that term I mean to indicate any strip of material of any length or size or shape, roll or otherwise.

I claim:

1. As a new article of manufacture, a roll of bag material adapted to be folded, sewed and severed to form separate bags, said bag material being provided with transverse indicating markings for the direction of the operator in forming it into a series of uniform bags, and with a series of uniform impressions containing matter appropriate to such proposed bags and arranged substantially in the middle of each successive area bounded by the indicating markings, a longitudinal edge, and the central longitudinal line of the roll.

2. As a new article of manufacture, a roll of bag material adapted to be folded, sewed and severed transversely to form separate bags, said bag material being provided with indicating markings for the direction of the operator in forming it into a series of uniform bags, and with a series of uniform impressions each containing matter appropriate to one of such proposed bags and arranged substantially in the middle of each successive area bounded by the indicating markings, a longitudinal edge, and the central longitudinal line of the roll.

3. As a new article of manufacture, a strip of bag material of proper width to have its edges united and form a bag tube and long enough so that the tube so formed may be divided into a plurality of bags, said strip being provided with a series of indicating markings, properly located to guide an operator in sewing and severing the tube transversely to form separate bags, and with a series of impressions, each impression of the series containing matter appropriate to a separate bag so formed, and each located substantially in the middle of an area bounded by a longitudinal edge of the strip, the central longitudinal line of the strip, and two of the lines of severance indicated by said indicating markings.

In testimony whereof I have hereunto signed my name to this specification.

ADELMER M. BATES.